United States Patent
Sugai et al.

(10) Patent No.: US 9,139,093 B2
(45) Date of Patent: Sep. 22, 2015

(54) PRINTED MATTER MANUFACTURING METHOD, PRINTED MATTER MANUFACTURING DEVICE, AND PRINTED MATTER

(75) Inventors: Keigo Sugai, Nagano (JP); Seigo Momose, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 905 days.

(21) Appl. No.: 13/301,860

(22) Filed: Nov. 22, 2011

(65) Prior Publication Data

US 2012/0142509 A1 Jun. 7, 2012

(30) Foreign Application Priority Data

Dec. 2, 2010 (JP) .................................. 2010-269678
Dec. 2, 2010 (JP) .................................. 2010-269679

(51) Int. Cl.
*B60K 37/02* (2006.01)
*B26D 7/08* (2006.01)

(52) U.S. Cl.
CPC ................ *B60K 37/02* (2013.01); *B26D 7/084* (2013.01); *B60K 2350/203* (2013.01); *B60K 2350/2039* (2013.01); *B60K 2350/402* (2013.01)

(58) Field of Classification Search
USPC ........... 493/374, 379, 340, 343; 428/1.6, 137, 428/217; 427/511
See application file for complete search history.

(56) References Cited

U.S. PATENT DOCUMENTS

| | | | | |
|---|---|---|---|---|
| 5,413,840 A | * | 5/1995 | Mizuno .................... | 428/195.1 |
| 5,512,226 A | * | 4/1996 | Rosica et al. ................. | 264/132 |
| 5,811,174 A | * | 9/1998 | Murakami ................. | 428/195.1 |
| 6,088,947 A | * | 7/2000 | Suzue et al. ............... | 43/18.1 R |
| 6,098,889 A | * | 8/2000 | Ogawa et al. ................. | 235/492 |
| 6,582,348 B2 | * | 6/2003 | Bacciottini et al. .......... | 493/123 |
| 7,712,887 B2 | | 5/2010 | Kadomatsu et al. | |
| 7,717,551 B2 | | 5/2010 | Kadomatsu et al. | |
| 2006/0182977 A1 | * | 8/2006 | Takenaka et al. ......... | 428/423.1 |
| 2008/0184930 A1 | | 8/2008 | Furukawa | |
| 2009/0038683 A1 | * | 2/2009 | Walter et al. ................. | 136/263 |
| 2009/0068418 A1 | | 3/2009 | Iwase et al. | |
| 2009/0085999 A1 | | 4/2009 | Furukawa | |
| 2010/0075121 A1 | * | 3/2010 | Uchiumi ....................... | 428/213 |
| 2011/0297256 A1 | * | 12/2011 | Roques ..................... | 137/561 R |
| 2013/0101798 A1 | * | 4/2013 | Hashimoto .................. | 428/157 |
| 2013/0267046 A1 | * | 10/2013 | Or-Bach et al. ................ | 438/14 |
| 2014/0306189 A1 | * | 10/2014 | Kwon et al. .................... | 257/40 |

FOREIGN PATENT DOCUMENTS

| | | |
|---|---|---|
| JP | 03-266695 A | 11/1991 |
| JP | 2005-321343 A | 11/2005 |
| JP | 2007-021886 A | 2/2007 |
| JP | 2007-030464 A | 2/2007 |
| JP | 2007-118450 A | 5/2007 |
| JP | 2007-313718 A | 12/2007 |

(Continued)

*Primary Examiner* — Christopher Harmon
(74) *Attorney, Agent, or Firm* — Global IP Counselors, LLP

(57) ABSTRACT

The printed matter manufacturing method includes the steps of providing a printed layer in a predetermined pattern on a substrate, and providing an open part penetrating through the substrate and the printed layer in an open part formation region. The printed matter manufacturing method has a step of providing a buffer layer for mitigating a shock imparted to the printed layer when the open part is provided, so that the buffer layer contacts the printed layer in at least a portion of a periphery of the open part formation region.

10 Claims, 9 Drawing Sheets

(56) References Cited

FOREIGN PATENT DOCUMENTS

| JP | 2008-105253 | A | 5/2008 |
|---|---|---|---|
| JP | 4127239 | B2 | 7/2008 |
| JP | 2008-207533 | A | 9/2008 |
| JP | 2008-213443 | A | 9/2008 |
| JP | 2008-213449 | A | 9/2008 |
| JP | 2009-082821 | A | 4/2009 |
| JP | 2009-096043 | A | 5/2009 |

* cited by examiner

PRINTED MATTER MANUFACTURING METHOD, PRINTED MATTER MANUFACTURING DEVICE, AND PRINTED MATTER

CROSS-REFERENCE TO RELATED APPLICATIONS

This application claims priority to Japanese Patent Application Nos. 2010-269678 and 2010-269679 both filed on Dec. 2, 2010. The entire disclosures of Japanese Patent Application Nos. 2010-269678 and 2010-269679 are hereby incorporated herein by reference.

BACKGROUND

1. Technical Field

The present invention relates to a printed matter manufacturing method and printed matter manufacturing device, and to a printed matter.

2. Related Art

An instrument panel for an automobile, for example, is formed by forming a light-blocking film or other printed layer in a predetermined pattern on a substrate. In this type of printed matter, a through-hole or other open part is provided according to the application. The open part is formed by die cutting, for example, or the like, but damage to the printed layer can occur during die cutting, depending on the material quality or thickness of the printed layer.

Therefore, a technique is disclosed in Japanese Patent No. 4127239, for example, whereby damage to the printed layer during punching is minimized by thinly forming the printed layer in the region in which the open part is formed.

SUMMARY

However, conventional techniques such as the one described above have such drawbacks as those described below.

Since the region in which the printed layer is thinly formed must be larger than the die, a thin region is left in the printed layer after punching, and light leakage can occur in this thin portion.

Although the printed layer is formed thinner than the other regions, depending on the material quality of the printed layer or the thickness of the region in which the open part is formed, damage may not be reliably suppressed.

The present invention was developed in view of the foregoing, and an object of the present invention is to provide a printed matter manufacturing method and printed matter manufacturing device whereby light leakage and damage to a printed layer can be prevented even in a case in which an open part is formed, and to provide a printed matter.

The present invention for achieving the abovementioned objects is configured as described below.

According to a printed matter manufacturing method of a first aspect of the present invention, a printed matter manufacturing method includes: forming a printed layer in a predetermined pattern on a substrate; forming an open part penetrating through the substrate and the printed layer in an open part formation region of the printed layer; and forming a buffer layer for mitigating a shock imparted to the printed layer by formation of the open part, so that the buffer layer contacts the printed layer in at least a portion of a periphery of the open part formation region.

Consequently, in the printed matter manufacturing method according to the first aspect, a portion of the shock imparted when the open part is provided is borne by the buffer layer, and the shock to the printed layer is mitigated, whereby damage to the printed layer can be prevented. Since the buffer layer can be provided in localized fashion in this aspect, the amount of material used to form in the buffer layer can be reduced, and the work time can be reduced, thereby contributing to enhanced productivity.

In the printed matter manufacturing method as described above, the forming of the buffer layer preferably includes forming the buffer layer having a hardness less than that of the printed layer.

Through this configuration, the buffer layer deforms to a greater degree than the printed layer, and the shock imparted to the printed layer when the open part is provided can be effectively borne.

In the printed matter manufacturing method as described above, the forming of the printed layer preferably includes forming the printed layer having a pencil hardness of H or greater, and the forming of the buffer layer preferably includes forming the buffer layer having a pencil hardness of less than H.

In the printed matter manufacturing method as described above, the forming of the buffer layer preferably includes forming the buffer layer so that the buffer layer contacts a side of the printed layer opposite from a side from which formation of the open part starts.

Through this configuration, since the shock applied to the printed layer from the side first to be processed is also imparted to the buffer layer positioned on the opposite side, and the shock is borne, the shock imparted to the printed layer can be reduced.

As well in a case in which the buffer layer is provided adjacent to the side of the printed layer first to be processed, since the punching tool makes contact with the buffer layer before reaching the printed layer, and the shock can be absorbed/borne, the shock imparted to the printed layer can be mitigated.

In the printed matter manufacturing method as described above, the forming of the buffer layer preferably includes forming side surfaces of the buffer layer to have a tapered shape that gradually decreases in diameter toward a top surface of the buffer layer that contacts the printed layer.

Through this configuration, it is possible to prevent the intersections of the side surfaces and top surface of the buffer layer from forming edges where stress is concentrated in the printed layer, and cracks and other damage from forming in the printed layer when the printed layer is formed so as to cover the buffer layer.

In the printed matter manufacturing method as described above, the forming of the buffer layer preferably includes forming the buffer layer based on information relating to the predetermined pattern of the printed layer, and information relating to a position of the open part in the predetermined pattern.

Through this configuration, there is no need to separately input information such as the formation position of the buffer layer, and the work time required to form the buffer layer can be reduced.

In the printed matter manufacturing method as described above, the forming of the printed layer and the forming of the buffer layer are preferably performed by a droplet discharge method.

Through this configuration, the buffer layer can be efficiently formed using the smallest amount of material, and the same droplet discharge device can be used to form the printed layer and the buffer layer, thereby contributing to enhanced manufacturing efficiency.

A printed matter manufacturing device according to a second aspect is a device for manufacturing a printed matter in which an open part penetrating through a substrate and a printed layer is formed in an open part formation region of the printed layer. The printed matter manufacturing device includes: a film formation device configured and arranged to form the printed layer in a predetermined pattern on the substrate; and a control device configured to control the film formation device to form a buffer layer for mitigating a shock imparted to the printed layer by formation of the open part, so that the buffer layer contacts the printed layer in at least a portion of a periphery of the open part formation region.

Consequently, in the printed matter manufacturing device according to this aspect, a portion of the shock imparted when the open part is provided is borne by the buffer layer, and the shock to the printed layer is mitigated, whereby damage to the printed layer can be prevented.

In the printed matter manufacturing device as described above, the control device is preferably configured to control the film formation device to form the buffer layer having a hardness less than that of the printed layer.

Through this configuration, the buffer layer deforms to a greater degree than the printed layer, and a portion of the shock imparted to the printed layer when the open part is provided can be effectively borne.

In the printed matter manufacturing device as described above, the control device is preferably configured to control the film formation device to form the printed layer having a pencil hardness of H or greater, and the buffer layer having a pencil hardness of less than H.

In the printed matter manufacturing device as described above, the control device is preferably configured to control the film formation device to form the buffer layer so that the buffer layer contacts a side of the printed layer opposite from a side from which formation of the open part starts.

Through this configuration, since the shock applied to the printed layer from the side first to be processed is also imparted to the buffer layer positioned on the opposite side, and the shock is borne, the shock imparted to the printed layer can be reduced.

As well in a case in which the buffer layer is provided adjacent to the side of the printed layer first to be processed, since the punching tool makes contact with the buffer layer before reaching the printed layer, and the shock can be absorbed/borne, the shock imparted to the printed layer can be mitigated.

In the printed matter manufacturing device as described above, the control device is preferably configured to control the film formation device to form side surfaces of the buffer layer to have a tapered shape that gradually decreases in diameter toward a top surface of the buffer layer that contacts the printed layer.

Through this configuration, it is possible to prevent the intersections of the side surfaces and top surface of the buffer layer from forming edges where stress is concentrated in the printed layer, and cracks and other damage from forming in the printed layer when the printed layer is formed so as to cover the buffer layer.

In the printed matter manufacturing device as described above, the control device is preferably configured to control the film formation device to form the buffer layer based on information relating to the predetermined pattern of the printed layer, and information relating to a position of the open part in the predetermined pattern.

Through this configuration, there is no need to separately input information such as the formation position of the buffer layer, and the work time required to form the buffer layer can be reduced.

In the printed matter manufacturing device as described above, the film formation device is preferably configured and arranged to form the printed layer and the buffer layer by a droplet discharge method.

Through this configuration, the buffer layer can be efficiently formed using the smallest amount of material, and the same droplet discharge device can be used to form the printed layer and the buffer layer, thereby contributing to enhanced manufacturing efficiency.

A printed matter according to a third aspect of the present invention includes: a substrate; a printed layer formed on a substrate; an open part penetrating through the substrate and the printed layer in an open part formation region of the printed layer; and a buffer layer contacting the printed layer in at least a portion of a periphery of the open part formation region to mitigate a shock imparted to the printed layer by formation of the open part.

Consequently, in the printed matter according to this aspect, a portion of the shock imparted when the open part is provided is borne by the buffer layer, and the shock to the printed layer is mitigated, whereby damage to the printed layer can be prevented. In the present invention, since the buffer layer can be provided in localized fashion, the amount of material used to form the buffer layer can be reduced, and the work time can be reduced, thereby contributing to enhanced productivity.

A printed matter manufacturing method according to a fourth aspect of the present invention includes: forming a printed layer on a substrate; forming an open part penetrating through the substrate and the printed layer; and forming a buffer layer for mitigating a shock imparted to the printed layer by formation of the open part, so that the buffer layer contacts an entire surface on one side of the printed layer.

Consequently, in the printed matter manufacturing method according to this aspect, a portion of the shock imparted when the open part is provided is borne by the buffer layer, and the shock to the printed layer is mitigated, whereby damage to the printed layer can be prevented.

A printed matter manufacturing device according to a fifth aspect is a device for manufacturing a printed matter in which an open part penetrating through a substrate and a printed layer is formed. The printed matter manufacturing device includes: a film formation device configured and arranged to form the printed layer on the substrate; and a control device configured to control the film formation device to form a buffer layer for mitigating a shock imparted to the printed layer by formation of the open part, so that the buffer layer contacts an entire surface on one side of the printed layer.

Consequently, in the printed matter manufacturing device of the present invention, a portion of the shock imparted when the open part is provided is borne by the buffer layer, and the shock to the printed layer is mitigated, whereby damage to the printed layer can be prevented.

A printed matter according to a sixth aspect of the present invention includes: a substrate; a printed layer formed on a substrate; an open part penetrating through the substrate and the printed layer; and a buffer layer contacting an entire surface on one side of the printed layer to mitigate a shock imparted to the printed layer by formation of the open part.

Consequently, in the printed matter of the present invention, a portion of the shock imparted when the open part is provided is borne by the buffer layer, and the shock to the printed layer is mitigated, whereby damage to the printed layer can be prevented.

BRIEF DESCRIPTION OF THE DRAWINGS

Referring now to the attached drawings which form a part of this original disclosure.

DETAILED DESCRIPTION OF EXEMPLARY EMBODIMENTS

First Embodiment

Figure 1:
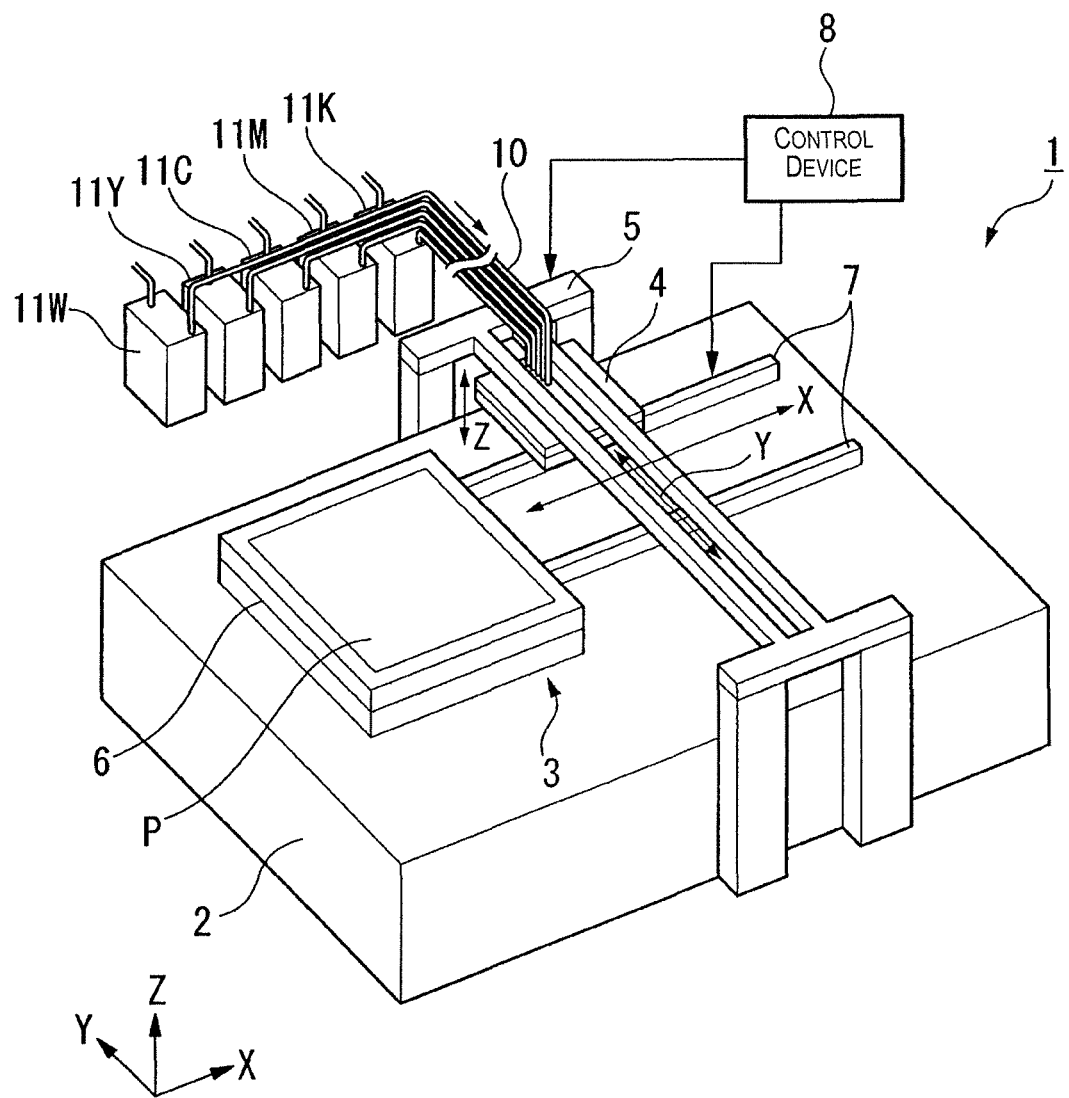
FIG. 1 is a view showing an embodiment of the present invention, and shows the overall configuration of the printing device.

The printed matter manufacturing method and printed matter manufacturing device according to a first embodiment of the present invention, and an embodiment of the printed matter will be described with reference to FIGS. 1 through 8C.

The embodiment described below is merely an example of the present invention and as such does not limit the present invention, and may be freely modified within the intended technical scope of the present invention. In order to facilitate understanding of components in the drawings referenced below, the scale, number of elements, and other aspects of each structure differ from the actual structure.

The printing device that is the printed matter manufacturing device used to manufacture the printed matter of the present invention will first be described.

FIG. 1 is a view showing the overall configuration of the printing device of the present invention. The printing device (printed matter manufacturing device) 1 is designed to draw characters/numbers or various designs or the like on a support P by discharging a photo-curing ink on the support (substrate) P and then subjecting the discharged photo-curing ink to light irradiation to cure the photo-curing ink.

The printing device 1 is provided with a base 2 for mounting the support P; a conveyance device 3 for conveying the support P on the base 2 in the X direction in FIG. 1; a droplet discharge head (not shown) for discharging the photo-curing ink; a carriage 4 provided with a plurality of droplet discharge heads; and a feed device 5 for moving the carriage 4 in a Y direction orthogonal to the X direction. In the present embodiment, the conveyance device 3 and the feed device 5 constitute a movement device for moving the support P and the carriage 4 relative to each other in the X direction and the Y direction, respectively.

The conveyance device 3 is provided with a workpiece stage 6 and a stage movement device 7 that are provided on the base 2. The workpiece stage 6 is provided so as to be able to be moved in the X direction on the base 2 by the stage movement device 7, and the workpiece stage 6 holds the support P conveyed from a conveyance device (not shown) upstream on the XY plane with the aid of a vacuum attaching mechanism, for example. The stage movement device 7 is provided with a ball screw, linear guide, or other bearing mechanism, and is configured so as to move the workpiece stage 6 in the X direction on the basis of a stage position control signal inputted from a control device 8 to indicate the X coordinate of the workpiece stage 6.

Figure 2:
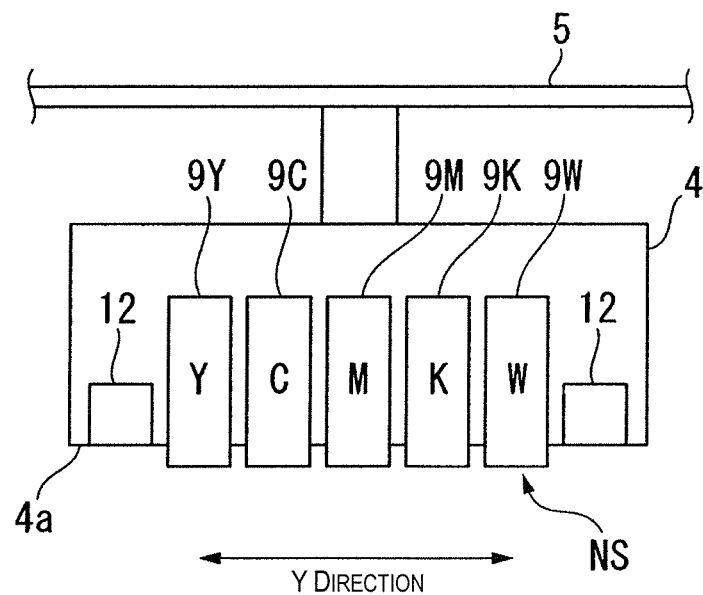
FIG. 2 is a side view showing the overall configuration of the carriage.
Figure 3:
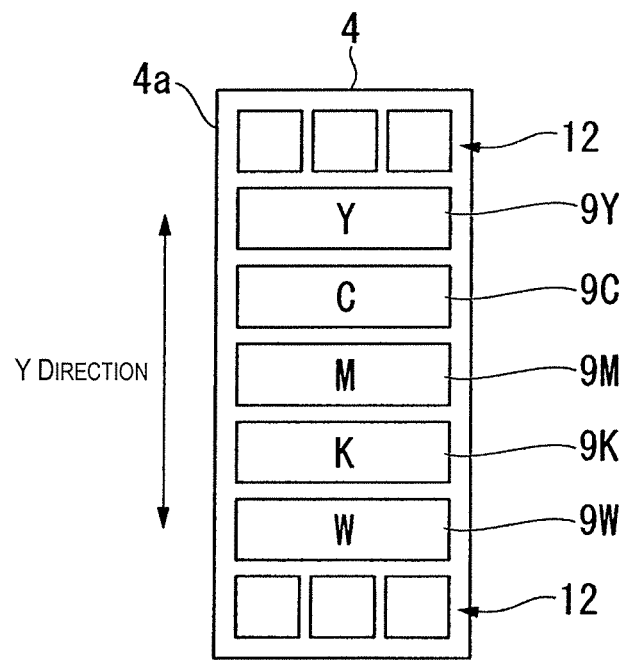
FIG. 3 is a bottom view showing the overall configuration of the carriage.

FIGS. 2 and 3 are views showing the carriage 4, where FIG. 2 is a lateral sectional view and FIG. 3 is a bottom view. As shown in FIGS. 2 and 3, the carriage 4 is a rectangular plate movably attached to the feeding device 5, and a plurality (four in the present embodiment) of droplet discharge heads (film formation devices) 9 is arranged in the Y direction is retained on a bottom surface 4a.

The plurality of droplet discharge heads 9 (9Y, 9C, 9M, 9K, 9W) is provided with numerous (a plurality of) nozzles, as described hereinafter, and discharges droplets of photo-curing ink on the basis of drawing data or drive control signals inputted from a control device 8. The droplet discharge heads 9 (9Y, 9C, 9M, 9W) discharge photo-curing inks that correspond to Y (yellow), C (cyan), M (magenta), and K (black), as well as a transparent or white (W) photo-curing ink, respectively, and a tube (duct) 10 is connected to each droplet discharge head 9 via the carriage 4, as shown in FIG. 1.

A first tank 11Y in which photo-curing ink for Y (yellow) is filled/stored via a tube 10 is connected to a droplet discharge head 9Y that corresponds to Y (yellow), and photo-curing ink for Y (yellow) is thereby fed to the droplet discharge head 9Y from the first tank 11Y.

Likewise, a second tank 11C filled with photo-curing ink for C (cyan) is connected to a droplet discharge head 9C that corresponds to C (cyan), a third tank 11M filled with photo-curing ink for M (magenta) is connected to a droplet discharge head 9M that corresponds to M (magenta), a fourth tank 11K filled with photo-curing ink for K (black) is connected to a droplet discharge head 9K that corresponds to K (black), and a fifth tank 11W filled with photo-curing ink for W (transparent) is connected to a droplet discharge head 9W that corresponds to W (transparent or white; transparent in this case). Through such a configuration, the corresponding photo-curing ink is fed to each droplet discharge head 9.

A heater or other heating means (not shown) is provided for each color (Y, C, M K, W) system in the droplet discharge heads 9Y, 9C, 9M, 9K, 9W, the tubes (ducts) 10, and the tanks 11Y, 11C, 11M, 11K, 11W. Specifically, a heating means for lowering the viscosity of the photo-curing ink to increase the fluidity thereof is provided to at least one of the droplet discharge head 9, the tube 10, and the tank 11 in each color system, and the photo-curing ink is thereby adjusted so as to be satisfactorily discharged from the droplet discharge heads 9.

The photo-curing ink is a UV-curing ink, for example, or another type of ink that is cured by light at a predetermined wavelength, and includes monomers, a photo-polymerization initiator, and pigments corresponding to each color. The photo-curing ink may also have surfactants, agents for preventing thermal radical polymerization, and various other additives admixed therein as needed. The wavelengths of light (UV rays) absorbed by such a photo-curing ink usually vary according to the components (composition) and other characteristics of the photo-curing ink, and the optimum wavelength for curing; i.e., the optimum curing wavelength, is therefore different for each ink.

Figure 4A:
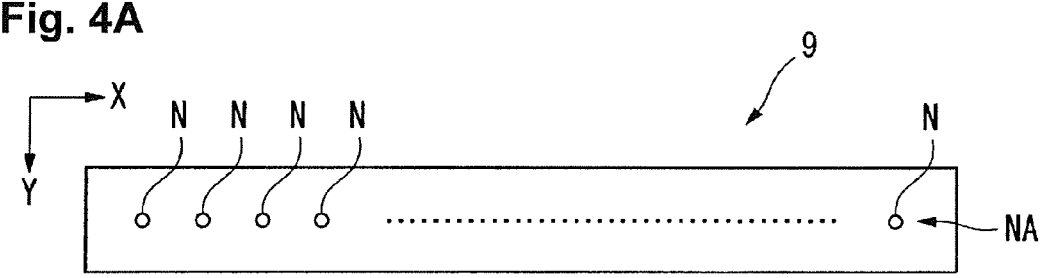
FIGS. 4A to 4C are views showing the overall configuration of the droplet discharge head.
Figure 4B:
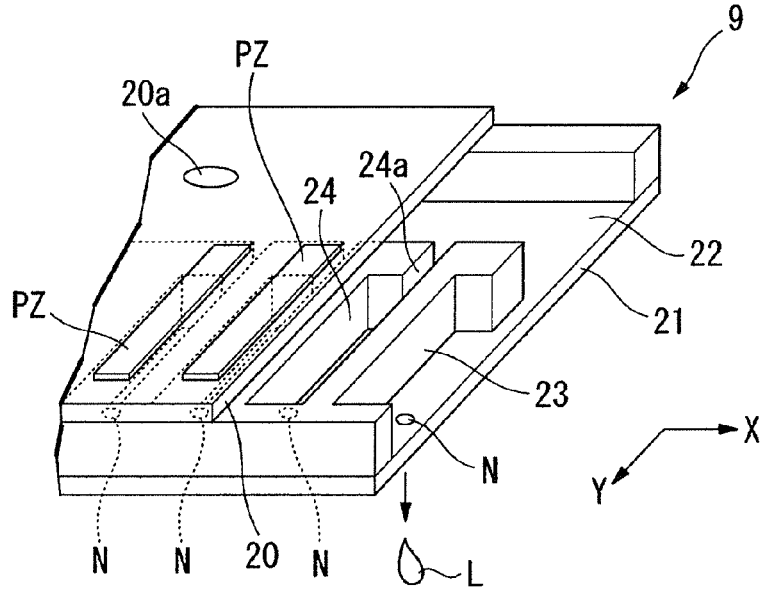
Figure 4C:
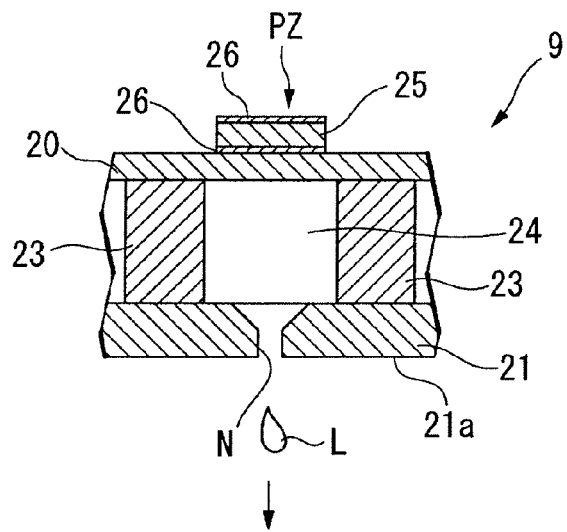

FIGS. 4A to 4C are view showing the overall configuration of a droplet discharge head 9. FIG. 4A is a plan view showing the droplet discharge head 9 from the work stage 6, FIG. 4B is a partial perspective view showing the droplet discharge head 9, and FIG. 4C is a partial sectional view showing a single nozzle of the droplet discharge head 9.

In the droplet discharge head 9 as shown in FIG. 4A, a plurality (e.g., 180) of nozzles N is arranged in a direction intersecting the Y direction, or in the X direction in the present embodiment, and a nozzle row NA is formed by the plurality of nozzles N. One row of nozzles is shown in FIG. 4A, but any number of nozzles and nozzle rows may be provided to the droplet discharge head 9, and a plurality of nozzle rows NA oriented in the X direction may be provided in the Y direction, for example.

As shown in FIG. 4B, the droplet discharge head 9 is provided with an oscillation plate 20 in which a material feeding hole 20a connected to the tube 10 is provided; a nozzle plate 21 in which the nozzles N are provided; a reservoir (liquid reservoir) 22 provided between the oscillation plate 20 and the nozzle plate 21; a plurality of barriers 23; and a plurality of cavities (liquid chambers) 24. A surface (bottom surface) of the nozzle plate 21 is a nozzle surface 21a in which a plurality of nozzle N is formed. Piezoelectric elements (drive elements) PZ are arranged on the oscillation plate 20 so as to correspond to the nozzles N. The piezoelectric elements PZ are composed of, e.g., piezo elements.

The reservoir 22 is filled with photo-curing ink that is fed via the material feeding hole 20a. The cavities 24 are formed by the oscillation plate 20, the nozzle plate 21, and a pair of barriers 23, and one cavity is provided for each nozzle N. In each cavity 24, photo-curing ink is introduced from the reservoir 22 via a feeding port 24a provided between the pair of barriers 23.

As shown in FIG. 4C, the piezoelectric element PZ is formed by a piezoelectric material 25 held between a pair of electrodes 26, and applying a drive signal to the pair of electrodes 26 causes the piezoelectric material 25 to contract. The oscillation plate 20 on which such a piezoelectric element PZ is placed therefore flexes outward (away from the cavity 24) at the same time integrally with the piezoelectric element PZ, and the volume of the cavity 24 is thereby increased.

An amount of photo-curing ink corresponding to the increase in volume thereby flows into the cavity 24 from the liquid reservoir 22 via the feeding port 24a. When application of the drive signal to the piezoelectric element PZ is then stopped, the piezoelectric element PZ and the oscillation plate 20 both return to their original shape, and the cavity 24 also returns to its original volume. The pressure of the photo-curing ink inside the cavity 24 is thereby increased, and a droplet L of photo-curing ink is discharged toward the support P from the nozzle N.

In the droplet discharge head 9 configured as described above, the bottom surface of the nozzle plate 21; i.e., the nozzle N formation surface (nozzle surface) NS, protrudes from the bottom surface 4a so as to be further downward than the bottom surface 4a of the carriage 4, as shown in FIG. 2.

As shown in FIGS. 2 and 3, light irradiation means 12 are provided adjacent to each other in the carriage 4 on both sides of the plurality (five in the drawings) of arranged droplet discharge head 9. Specifically, the light irradiation means 12 are disposed on both sides in the arrangement direction of the droplet discharge heads 9 arranged in the Y direction.

The ink-curing light irradiation means 12 cure the photo-curing ink, and are composed of numerous LEDs (light-emitting diodes) in the present embodiment. However, the ink-curing light irradiation means 12 are not limited to LEDs in the present invention; e.g., laser diodes (LD), mercury vapor lamps, metal halide lamps, xenon lamps, excimer lamps, or the like may also be used as the ink-curing light irradiation means 12 insofar as light of a wavelength which accelerates polymerization of the photo-curing ink can be emitted. In the case that a UV-curing ink, for example, is used as the photo-curing ink, various light sources for emitting UV rays may be used.

The light radiated by the ink-curing light irradiation means 12 composed of LED elements in the present embodiment has a wavelength that corresponds to the optimum curing wavelength of the photo-curing ink discharged by the droplet discharge heads 9. In other words, each type of photo-curing ink is assumed to have a different optimum curing wavelength according to the components (composition) thereof, as previously mentioned, but by radiating light such as described above, light is radiated which has the optimum curing wavelength for the corresponding photo-curing ink.

Figure 5A:
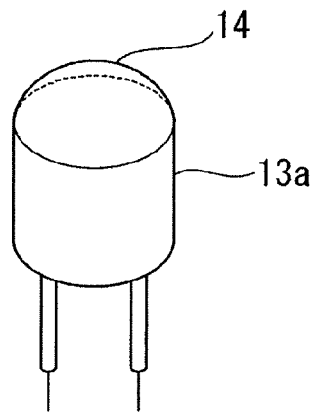
FIGS. 5A to 5C are views showing the light irradiation means.
Figure 5B:
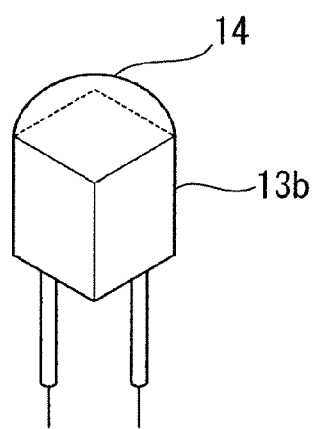
Figure 5C:
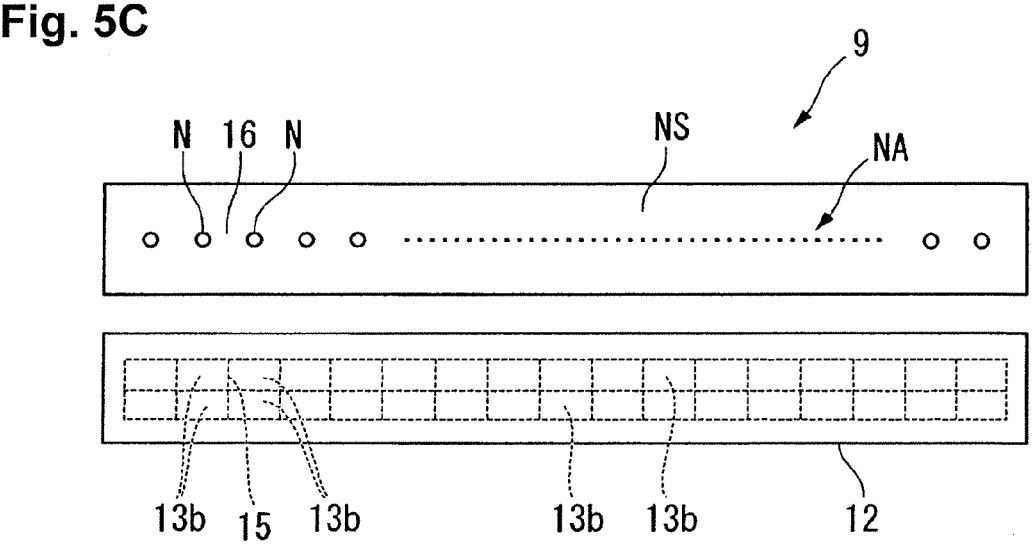

FIGS. 5A to 5C are views showing the light irradiation means 12. A commercially available LED light source 13a, for example, such as shown in FIG. 5A is used in the ink-curing light irradiation means 12, but a light source 13b in which the sides of the element body thereof form a rectangle, square, or other polygonal shape such as shown in FIG. 5B is more suitable for use. Specifically, light sources 13b are aligned longitudinally and transversely as shown in FIG. 5C and attached to the carriage 4 as a single large rectangular light irradiation source (light irradiation means 12). Forming each light source 13b so as to be square or rectangular in planar view as shown in FIG. 5B enables the light sources 13b to be arranged at a high density in the longitudinal and transverse directions. Consequently, adequately high light output can be obtained from the light radiation source (light irradiation means 12) thus formed.

As shown in FIG. 5C, the light irradiation means 12 is formed by arranging the light sources 13b to substantially the same length as that of the nozzle row NA of the corresponding droplet discharge head 9. The light sources 13b are arranged so that spaces 15 between pairs of adjacent light sources 13b correspond to spaces 16 between pairs of adjacent nozzles N among the plurality of nozzles N.

Through this configuration, the light from the light sources 13b in the light irradiation means 12 can be reliably radiated to the photo-curing ink that is discharged from the nozzles N. Specifically, such a configuration makes it possible to prevent a situation in which the ink discharged from a nozzle N is not adequately irradiated by the light from the light sources 13b when the nozzle N is in a position that corresponds to a space 15 between the light sources 13b.

In FIG. 5C, the nozzles N and the light sources 13b are shown as being provided at a 1:1 ratio, but the nozzles N are actually far smaller than the light sources 13b, and a single light source 13b therefore corresponds to a plurality of nozzles. The spaces 15 between pairs of adjacent light sources 13b correspond to the spaces 16 between pairs of adjacent nozzles N in this case as well.

In FIG. 5C, two rows of light sources 13b are formed in alignment with the nozzle row NA, but there may also be one row of light sources 13b, or three or more rows thereof. Furthermore, FIG. 5C shows the light irradiation means 12 as having a single group of light sources, but a single light irradiation means 12 may be formed by a plurality of groups of light sources; e.g., as shown in FIG. 3.

The light irradiation means 12 composed of light sources 13b such as described above are attached to the carriage 4 so that the light emission surfaces 14 of the light sources 13b shown in FIG. 5B are substantially flush with the bottom surface 4a of the carriage 4, as shown in FIG. 2. The light irradiation means 12 are thereby configured so that the light emission surfaces are positioned at a higher elevation than the nozzle surfaces of the corresponding droplet discharge heads 9. This configuration makes it possible to reliably prevent the light radiated from the light irradiation means 12 from irradiating the nozzles N of the droplet discharge heads 9, curing the ink inside the nozzles N, and causing the nozzles N to become blocked.

Cooling means (not shown) are also provided to the carriage 4 in the vicinity of the light irradiation means 12. The cooling means works by recirculating a coolant fluid, and a cooling means composed of a Peltier element, or another publicly known cooling means may be used. Providing such a cooling means in the vicinity of the light irradiation means 12 prevents degradation and reduction of service life due to the heat of the LED light sources 13b (13a) or the surrounding components, and makes it possible to increase the service life of the light irradiation means 12.

As shown in FIG. 1, the feeding device 5 for moving the carriage 4 is structured as a bridge over the base 2, for example, and is provided with a ball screw, linear guide, or other bearing mechanism with respect to the Y direction and the Z direction orthogonal to the XY plane. The feeding device 5 based on such a structure moves the carriage 4 in the Y direction as well as the Z direction on the basis of a carriage position control signal inputted from the control device 8 that indicates a Y coordinate and Z coordinate of the carriage 4.

The control device 8 outputs the stage position control signal to the stage movement device 7, outputs the carriage position control signal to the feeding device 5, and outputs drawing data and drive control signals to drive circuit boards (not shown) of the droplet discharge heads 9. The control device 8 thereby synchronously controls the operation for positioning the support P by movement of the workpiece stage 6, and the operation for positioning the droplet discharge heads 9 by the movement of the carriage 4, so as to move the substrate P and the carriage 4 relative to each other. The control device 8 also causes droplets of photo-curing ink to be arranged in predetermined positions on the support P by actuating the discharge of droplets by the droplet discharge heads 9. The control device 8 is also configured so as to actuate light radiation by the light irradiation means 12 separately from actuating ejection of droplets by the droplet discharge heads 9.

The printing device 1 is configured such as described above.

Figure 6:
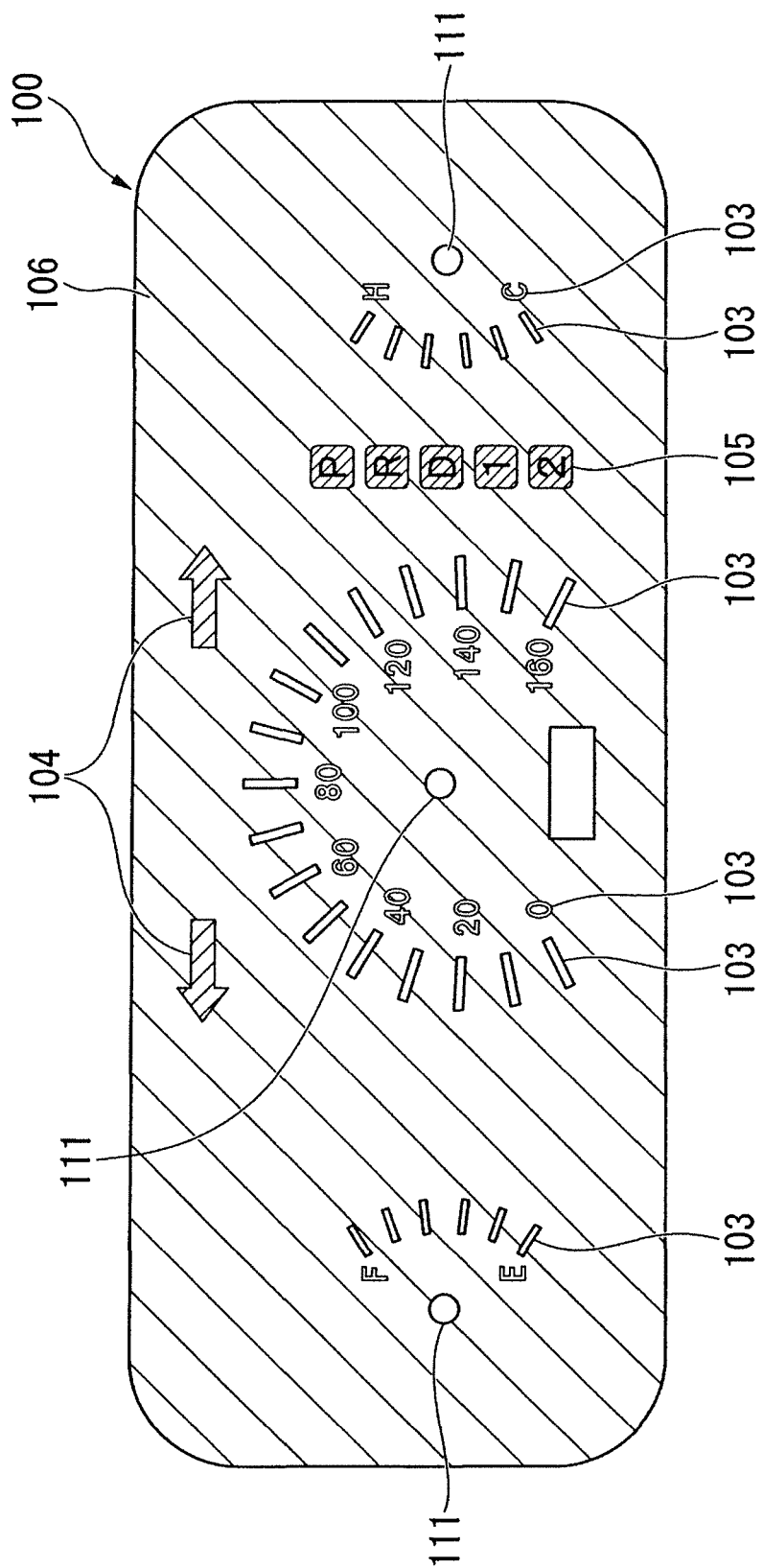
FIG. 6 is a front view showing the printed matter according to the present invention.

The printed matter manufactured by using the printing device 1 described above will next be described with reference to FIG. 6.

In the present embodiment, an instrument panel (meter dial) for automobile instruments is described as an example of the printed matter.

The printed matter 100 is composed of a design having transparent light-transmitting parts 103, colored light-transmitting parts 104, 105, a light-blocking part 106, and open parts 111.

The transparent light-transmitting parts 103 are transparent regions for passing light, and form graduations or characters. The colored light-transmitting parts 104 are blue regions for passing light, for example, and are display parts for displaying the indicated direction of a turn signal. The colored light-transmitting parts 105 are yellow regions for passing light, for example, and are display parts for displaying a shift option. The light-blocking part 106 is a black region which does not pass light, and is a background part for graduations or characters. The open parts 111 are formed penetrating through the printed matter 100, and are the insertion points for rotating shafts (not shown) which rotate and support meter indicator needles.

Figure 7:
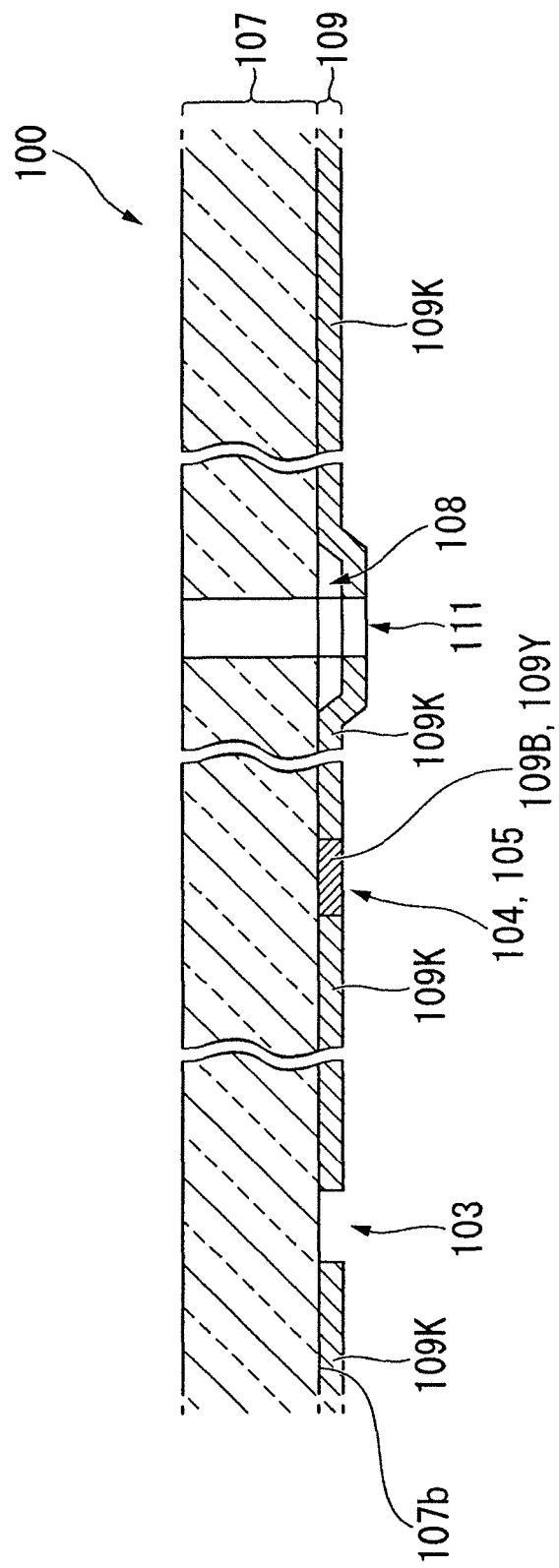
FIG. 7 is a partial sectional view showing the printed matter according to a first embodiment of the present invention.

As shown in the enlarged sectional view of FIG. 7, the printed matter 100 has a transparent resin substrate (base material) 107; an image layer (printed layer) 109 provided to a back surface 107b of the resin substrate 107 and corresponding to the color of the colored light-transmitting parts 104, 105 and light-blocking part 106; and a buffer layer 108.

The resin substrate 107 is composed of polycarbonate, PET, or other transparent resin. According to the application, an anti-glare layer for reducing glare due to outside light is formed on the surface of the resin substrate 107.

The buffer layer 108 is formed by applying transparent photo-curing ink to the back surface 107b of the resin substrate 107 at and around the positions at which the open parts 111 are to be formed (open part formation regions), and by curing the photo-curing ink by ultraviolet irradiation, a film is formed having a pencil hardness of less than H, for example, or more specifically, having a pencil hardness of about B to 2B. The buffer layer 108 is provided having a tapered shape in which the side surfaces thereof gradually decrease in diameter toward the top surface (bottom surface in FIG. 7).

The image layer 109 has a blue part 109B formed by applying blue photo-curing ink at the position of the colored light-transmitting part 104; a yellow part 109Y formed by applying yellow photo-curing ink at the position of the colored light-transmitting part 105; and a black part 109K formed by applying black photo-curing ink at the position of the light-blocking part 106 in the region outside the colored light-transmitting parts 104, 105 and the transparent light-transmitting parts 103. The black part 109K is provided adjacent to the opposite side of the buffer layer 108 from the resin substrate 107 in the open part formation region.

The transparent light-transmitting parts 103 are formed by openings where the black part 109K is not formed. The blue part 109B, yellow part 109Y, and black part 109K are cured by irradiating the photo-curing ink of each color with ultraviolet rays, thereby forming films having a pencil hardness of H or greater, for example, or more specifically, having a pencil hardness of about 2H to H.

The open parts 111 are formed by punching through the resin substrate 107, the buffer layer 108, and the image layer 109 (black part 109K) through use of a punching device not shown in the drawings after printing by the printing device 1 described above.

The procedure for manufacturing the printed matter 100 using the printing device 1 and a punching device will next be described with reference to FIGS. 8A to 8C.

Figure 8A:
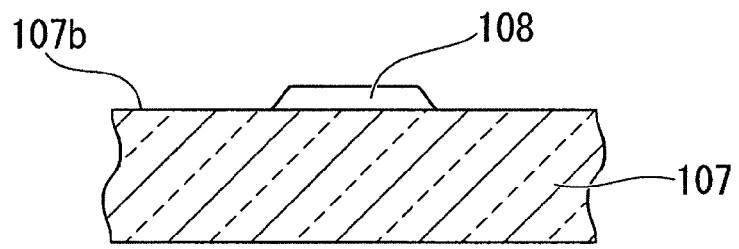
FIGS. 8A to 8C are views showing the steps for manufacturing the printed matter according to the first embodiment of the present invention.
Figure 8B:
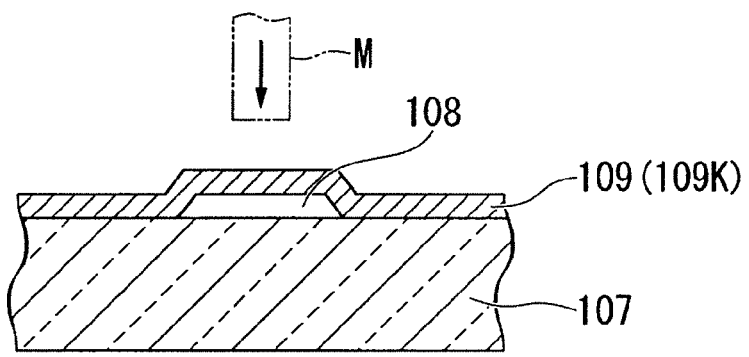

First, as shown in FIG. 8A, the control device 8 causes the transparent photo-curing ink to be discharged/applied at an around the positions at which the open parts 111 are to be formed on the back surface 107b of the resin substrate 107 through use of the droplet discharge heads 9 of the printing device 1, and causes a film of the buffer layer 108 to be formed by causing ultraviolet rays, for example, to be radiated from the light irradiation means 12 to cure the photo-curing ink.

At this time, the control device 8 sets the position for forming the buffer layer 108 on the basis of position information of the printing pattern of the image layer 109 and placement information of the open parts 111, and causes photo-curing ink to be discharged from the droplet discharge heads 9.

The image layer 109 is then formed on the formed buffer layer 108 as shown in FIG. 8B by applying and photo-irradiating the black, blue, and yellow photo-curing ink in predetermined positions through use of the printing device 1 described above (only the black part 109K is shown in FIGS. 8A to 8C). At this time, when discharge and curing are performed in the order of yellow, then black, for example, the dark-colored ink droplets bleed with respect to the light-colored ink droplets, and boundary contours are unclear due to the prominence of the bled dark color. However, when discharge and curing are performed for dark-colored ink first, since boundary contours can be formed first by the prominent color, the boundary contours can be clearly formed, and the display quality can be enhanced.

Figure 8C:
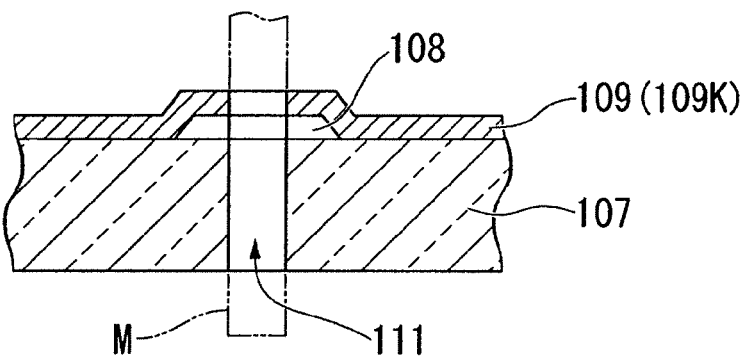

When the buffer layer 108 and the image layer 109 are formed on the resin substrate 107, after a punching die M in a press device or other punching device is set in the position facing the formation region for the open parts 111 (see FIG. 8B), the punching die M is moved (lowered) toward the resin substrate 107 from the image layer 109 as shown in FIG. 8C to punch through the image layer 109 (black part 109K), the buffer layer 108, and the resin substrate 107 in order and form the open parts 111.

Here, a portion of the shock received by the image layer 109 (black part 109K) as a result of contact with the punching die M during punching acts to deform the buffer layer 108 provided on the back of the image layer 109, and the shock received by the image layer 109 is mitigated.

Second Embodiment

The printed matter manufacturing method and printed matter manufacturing device, and the printed matter according to a second embodiment of the present invention will next be described. The first embodiment and second embodiment are the same except for the structure of the printed matter and the method for manufacturing the printed matter. Therefore, the aspects which are the same will not be described, and a description of only the points of departure between the two embodiments will be given with reference to FIGS. 9 and 10A to 10C.

The embodiment described below is merely an example of the present invention and as such does not limit the present invention, and may be freely modified within the intended technical scope of the present invention. In order to facilitate understanding of components in the drawings referenced below, the scale, number of elements, and other aspects of each structure differ from the actual structure.

Figure 9:
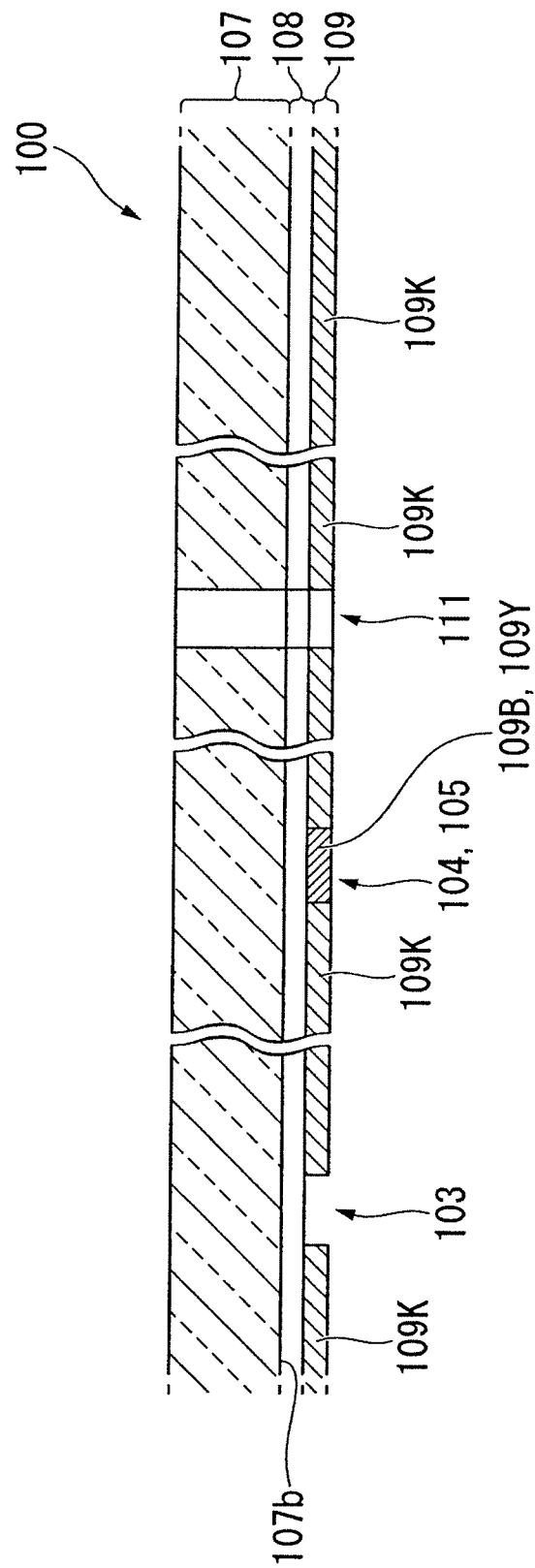
FIG. 9 is a partial sectional view showing the printed matter according to a second embodiment of the present invention.

As shown in the enlarged sectional view of FIG. 9, the printed matter 100 has a transparent resin substrate (base material) 107; a transparent buffer layer 108 provided to a back surface 107b of the resin substrate 107; and an image layer (printed layer) 109 which corresponds to the color of the colored light-transmitting parts 104, 105 and light-blocking part 106.

The resin substrate 107 is composed of polycarbonate, PET, or other transparent resin. According to the application, an anti-glare layer for reducing glare due to outside light is formed on the surface of the resin substrate 107.

The buffer layer 108 is formed by applying transparent photo-curing ink to the entire back surface 107b of the resin substrate 107 and by curing the photo-curing ink by ultraviolet irradiation, whereby a film is formed having a pencil hardness of less than H, for example, or more specifically, having a pencil hardness of about B to 2B.

The image layer 109 has a blue part 109B formed by applying blue photo-curing ink at the position of the colored light-transmitting part 104; a yellow part 109Y formed by applying yellow photo-curing ink at the position of the colored light-transmitting part 105; and a black part 109K formed by applying black photo-curing ink at the position of the light-blocking part 106 in the region outside the colored light-transmitting parts 104, 105 and the transparent light-transmitting parts 103. The transparent light-transmitting parts 103 are formed by openings where the black part 109K is not formed. The blue part 109B, yellow part 109Y, and black part 109K are cured by irradiating the photo-curing ink of each color with ultraviolet rays, thereby forming films having a pencil hardness of H or greater, for example, or more specifically, having a pencil hardness of about 2H to H.

The open parts 111 are formed by punching through the resin substrate 107, the buffer layer 108, and the image layer 109 through use of a punching device not shown in the drawings after printing by the printing device 1 described above.

The procedure for manufacturing the printed matter 100 using the printing device 1 and a punching device will next be described with reference to FIGS. 10A to 10C.

Figure 10A:
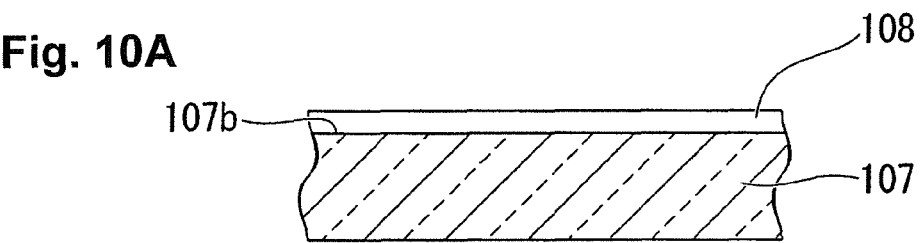
FIGS. 10A to 10C are views showing the steps for manufacturing the printed matter according to the second embodiment of the present invention.

First, as shown in FIG. 10A, the buffer layer 108 is formed by using the printing device 1 described above to discharge/apply the transparent photo-curing ink to the entire back surface 107b of the resin substrate 107, and causing ultraviolet rays, for example, to be radiated from the light irradiation means 12 to cure the photo-curing ink.

Figure 10B:
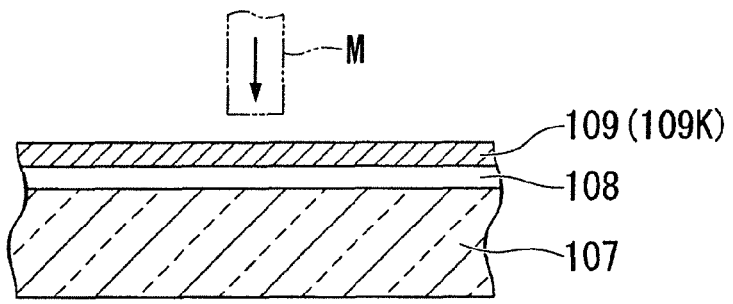

The image layer 109 is then formed on the formed buffer layer 108 as shown in FIG. 10B by applying and photo-irradiating the black, blue, and yellow photo-curing ink in predetermined positions through use of the printing device 1 described above. At this time, when discharge and curing are performed in the order of yellow, then black, for example, the dark-colored ink droplets bleed with respect to the light-colored ink droplets, and boundary contours are unclear due to the prominence of the bled dark color. However, when discharge and curing are performed for dark-colored ink first, since boundary contours can be formed first by the prominent color, the boundary contours can be clearly formed, and the display quality can be enhanced.

Figure 10C:
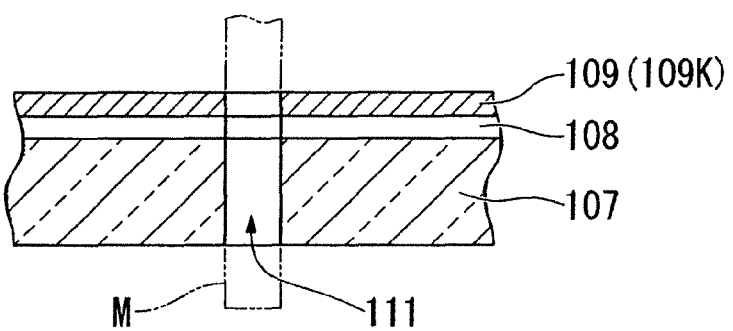

When the buffer layer 108 and the image layer 109 are formed on the resin substrate 107, after a punching die M in a press device or other punching device is set in the position facing the formation region for the open parts 111 (see FIG. 10B), the punching die M is moved (lowered) toward the resin substrate 107 from the image layer 109 as shown in FIG. 10C to punch through the image layer 109, the buffer layer 108, and the resin substrate 107 in order and form the open parts 111.

Here, a portion of the shock imparted to the image layer 109 as a result of contact with the punching die M during punching is borne through deformation of the buffer layer 108 provided on the back of the image layer 109, and the shock imparted to the image layer 109 is mitigated.

Working Example

The first embodiment and second embodiment of the present invention were implemented under the conditions described below.

Open parts 111 were formed in a printed matters 100 in which the image layer 109 was formed having a thickness of 50 μm, and the buffer layer 108 was formed having a thickness of 4 μm, 8 μm, 10 μm, 13 μm, and 18 μm, respectively. At this time, no splintering or cracking occurred in the image layer 109 in the printed matters 100 in which the buffer layer 108 was formed having a thickness of 10 μm, 13 μm, or 18 μm, but in the image layer 109 of the printed matters 100 in which the buffer layer 108 was formed having a thickness of 4 μm and 8 μm, splintering or cracking occurred around the punched open parts 111.

The thickness of the buffer layer 108 is therefore preferably at least 20% greater than the thickness of the image layer 109.

In the first and second embodiments of the present invention, since the shock imparted to the image layer 109 during punching is borne by the buffer layer 108 so that the load on the image layer 109 is reduced, light leakage or cracks and other damage can be prevented from occurring in the image layer 109 even when open parts 111 are formed. In the present embodiment in particular, since the buffer layer 108 is provided with a lesser hardness than the image layer 109, even in a case in which the buffer layer 108 and the image layer 109 are subjected to about the same shock/load, the buffer layer 108 deforms to a greater degree than the image layer 109, and the shock/load imparted to the image layer 109 can thereby be effectively reduced.

In the first embodiment of the present invention, since the buffer layer 108 is provided in localized fashion at and around the positions at which the open parts are to be formed, the amount of material used to form the buffer layer 108 can be reduced, and the work time needed to form the buffer layer 108 can be reduced, thereby contributing to enhanced productivity.

In the first embodiment of the present invention, since the position at which the control device 8 forms the buffer layer 108 is set based on information relating to the printing pattern of the image layer 109 and placement information of the open parts 111, there is no need to separately input information such as the formation position of the buffer layer 108, and the work time required to form the buffer layer 108 can be reduced.

Furthermore, in the first embodiment of the present invention, since the buffer layer 108 and the image layer 109 are both formed by a droplet discharge method, the buffer layer 108 and the image layer 109 can be efficiently formed using the smallest amount of material, and the same printing device 1 can be used, thereby contributing to enhanced manufacturing efficiency.

In the second embodiment of the present invention, since the buffer layer 108 is formed on the entire surface of the resin substrate 107, even in a case in which the positions of the open parts 111 are modified by a design modification or the like, the shock/load imparted to the image layer 109 at the new positions can be effectively reduced and damage prevented.

Preferred embodiments of the present invention are described above with reference to the accompanying drawings, but the present invention shall not be construed as being limited by these examples. The shapes, combinations, and other aspects of the constituent members described in the examples above are merely examples, and various modifications may be made based on design requirements within a range that does not depart from the spirit of the invention.

For example, in the first embodiment described above, the buffer layer 108 is provided by a droplet discharge method using the printing device 1, but this configuration is not limiting, and the buffer layer 108 may also be provided by a lithography method, for example, or other method.

In the second embodiment described above, the buffer layer 108 is provided by a droplet discharge method using the printing device 1, but this configuration is not limiting, and the buffer layer 108 may also be provided by a spin coating method, a dipping method, a printing method, or another method.

In the above embodiments, examples are described of a configuration in which the buffer layer 108 is provided adjacent to the opposite side of the image layer 109 from the side thereof first to be punched, but this configuration is not limiting, and the buffer layer 108 may also be provided adjacent to the side of the image layer 109 that is first to be punched.

In this case, since the buffer layer 108 makes contact and can absorb/bear the shock before the punching die M reaches the image layer 109, the shock imparted to the image layer 109 can be mitigated, and the same operation/effect is obtained as in the embodiments described above.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printed matter manufacturing method comprising:
    forming a printed layer in a predetermined pattern on a substrate;
    forming an open part penetrating through the substrate and the printed layer in an open part formation region of the printed layer; and
    forming a buffer layer for mitigating a shock imparted to the printed layer by formation of the open part, so that the buffer layer contacts the printed layer in at least a portion of a periphery of the open part formation region,
    the forming of the buffer layer including forming the buffer layer so that the buffer layer contacts a side of the printed layer opposite from a side from which formation of the open part starts, and
    the forming of the buffer layer further including forming side surfaces of the buffer layer to have a tapered shape that gradually decreases in diameter toward a top surface of the buffer layer that contacts the printed layer.

2. The printed matter manufacturing method according to claim 1, wherein
    the forming of the buffer layer includes forming the buffer layer having a hardness less than that of the printed layer.

3. The printed matter manufacturing method according to claim 2, wherein
the forming of the printed layer includes forming the printed layer having a pencil hardness of H or greater, and
the forming of the buffer layer includes forming the buffer layer having a pencil hardness of less than H.

4. The printed matter manufacturing method according to claim 1, wherein
the forming of the buffer layer includes forming the buffer layer based on information relating to the predetermined pattern of the printed layer, and information relating to a position of the open part in the predetermined pattern.

5. The printed matter manufacturing method according to claim 1, wherein
the forming of the printed layer and the forming of the buffer layer are performed by a droplet discharge method.

6. A printed matter manufacturing device for manufacturing a printed matter in which an open part penetrating through a substrate and a printed layer is formed in an open part formation region of the printed layer, the printed matter manufacturing device comprising:
a film formation device configured and arranged to form the printed layer in a predetermined pattern on the substrate; and
a control device configured to control the film formation device to form a buffer layer for mitigating a shock imparted to the printed layer by formation of the open part, so that the buffer layer contacts the printed layer in at least a portion of a periphery of the open part formation region,
the control device being configured to control the film formation device to form the buffer layer so that the buffer layer contacts a side of the printed layer opposite from a side from which formation of the open part starts, and
the control device being further configured to control the film formation device to form side surfaces of the buffer layer to have a tapered shape that gradually decreases in diameter toward a top surface of the buffer layer that contacts the printed layer.

7. The printed matter manufacturing device according to claim 6, wherein
the control device is configured to control the film formation device to form the buffer layer having a hardness less than that of the printed layer.

8. The printed matter manufacturing device according to claim 7, wherein
the control device is configured to control the film formation device to form the printed layer having a pencil hardness of H or greater, and the buffer layer having a pencil hardness of less than H.

9. The printed matter manufacturing device according to claim 6, wherein
the control device is configured to control the film formation device to form the buffer layer based on information relating to the predetermined pattern of the printed layer, and information relating to a position of the open part in the predetermined pattern.

10. The printed matter manufacturing device according to claim 6, wherein
the film formation device is configured and arranged to form the printed layer and the buffer layer by a droplet discharge method.

* * * * *